(12) United States Patent
Nakamura et al.

(10) Patent No.: US 8,482,179 B2
(45) Date of Patent: Jul. 9, 2013

(54) BRUSHLESS MOTOR HAVING A REDUCED AXIAL DIMENSION

(75) Inventors: Manabu Nakamura, Nagano (JP); Yuzuru Suzuki, Nagano (JP); Hiroyuki Furusaki, Nagano (JP)

(73) Assignee: Minebea Co., Ltd., Nagano (JP)

( * ) Notice: Subject to any disclaimer, the term of this patent is extended or adjusted under 35 U.S.C. 154(b) by 136 days.

(21) Appl. No.: 12/911,051

(22) Filed: Oct. 25, 2010

(65) Prior Publication Data

US 2011/0148239 A1      Jun. 23, 2011

(30) Foreign Application Priority Data

Dec. 18, 2009   (JP) ................................. 2009-287604

(51) Int. Cl.
*H02K 21/12* (2006.01)
*H02K 1/16* (2006.01)

(52) U.S. Cl.
USPC ..... 310/179; 310/156.01; 310/180; 310/216.073

(58) Field of Classification Search
USPC ............. 310/179, 180, 184, 187, 195, 208, 310/216.069, 216.071, 216.072, 216.073
IPC ........................................................ H02K 1/26
See application file for complete search history.

(56) References Cited

U.S. PATENT DOCUMENTS

| | | | | |
|---|---|---|---|---|
| 5,164,622 A | * | 11/1992 | Kordik | 310/67 R |
| 5,670,836 A | * | 9/1997 | Horst | 310/156.15 |
| 5,675,196 A | * | 10/1997 | Huang et al. | 310/67 R |
| 5,796,194 A | * | 8/1998 | Archer et al. | 310/68 B |
| 6,201,322 B1 | * | 3/2001 | Heine et al. | 310/51 |
| 7,166,948 B2 | * | 1/2007 | Petersen | 310/179 |
| 2009/0218903 A1 | | 9/2009 | Matsubara | |
| 2009/0243423 A1 | * | 10/2009 | Hattori | 310/216.092 |

FOREIGN PATENT DOCUMENTS

| | | |
|---|---|---|
| JP | 3524138 | 5/2004 |
| JP | 2009-207298 | 9/2009 |

* cited by examiner

*Primary Examiner* — Tran Nguyen
*Assistant Examiner* — Thomas Truong
(74) *Attorney, Agent, or Firm* — Carrier Blackman & Associates, P.C.; Joseph P. Carrier; William D. Blackman

(57) ABSTRACT

A brushless motor includes: a stator assembly including a stator core which includes a plurality of pole teeth each having a winding therearound; and a rotor assembly including a magnet which has a ring shape, is rotatably disposed so as to oppose the pole teeth of the stator core and which is circumferentially magnetized with a plurality of magnetic poles with opposite polarities alternating with each other, wherein the number of the pole teeth of the stator core is twice the number of the magnetic poles of the magnet such that each magnetic pole opposes a pair of adjacent pole teeth, one pair of adjacent windings have the same number of winding turns and the same winding direction as each other, and wherein another pair of windings located next to the one pair of windings have a winding direction opposite to the winding direction of the one pair of windings.

6 Claims, 8 Drawing Sheets

Close-up view of a portion B

Close-up view of a portion A in FIG.1A

Close-up view of a portion B in FIG.2A

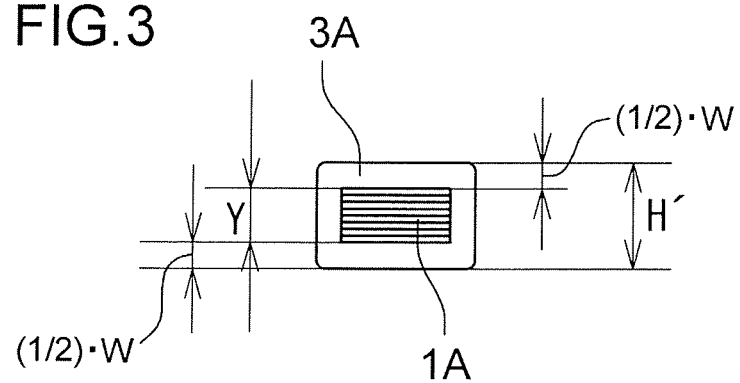

Close-up view of a portion C in FIG.6A

Close-up view of a portion D in FIG.7A

BRUSHLESS MOTOR HAVING A REDUCED AXIAL DIMENSION

BACKGROUND OF THE INVENTION

1. Field of the Invention

The present invention relates to a brushless motor, such as a permanent-magnet small motor, a spindle motor and various micro motors, generally used for office automation equipment and the like.

2. Description of the Related Art

While brushless motors come in various configurations, most of the brushless motors are structured to include: a stator assembly which is composed such that a multi-phase winding is wound around each of pole teeth of a stator core having a plurality of slots; and a rotor assembly which includes an annular rotor magnet disposed to oppose the stator assembly and having opposite magnetic polarities alternately arranged in the circumferential direction and which is rotatably supported, wherein the multi-phase winding is energized in a selectively switching manner, whereby the rotor assembly is caused to rotate by the electromagnetic interaction between the current of the winding and the magnetic field of the rotor magnet.

In the brushless motors, the polarity and rotational position of the rotor magnet are detected by a sensor such as a Hall element or a voltage induced at the winding, whereby the timing of energization is switched in a controlled manner. The brushless motors fall into two types: an outer rotor type structured such that the rotor assembly is disposed outside the stator assembly; and an inner rotor type structured such that the rotor assembly is disposed inside the stator assembly.

A conventional outer rotor type brushless motor is disclosed, for example, in FIG. 1 of Japanese Patent No. 3524138. In the brushless motor, the number of slots of a stator core is a multiple of two (even number), more specifically an even number larger than four, and the number of magnetic poles of a rotor magnet is equal to the number of slots (that is to say, the number of pole teeth). Further, the brushless motor has a sensor disposed to axially face the rotor magnet and positioned radially outward of the slot between two arbitrary adjacent pole teeth of the stator core.

Windings individually wound around the pole teeth of the stator core form respective circuit networks, which are driven with substantially no turn-off time by a single-phase power supply and simultaneously by means of bidirectional energization where the direction of energization is reversed, wherein the windings are excited such that the electromagnetic pole of each winding formed by energization has a polarity opposite to that of the magnetic pole of the rotor magnet, which is positioned to oppose the electromagnetic pole of the relevant winding.

In the brushless motor described above, the number of the magnetic poles of the rotor magnet is equal to the number of the slots (pole teeth) of the stator core, and the windings disposed around the pole teeth of the stator core, when having a large number of winding turns, block reduction of the axial dimension, that is the overall height, of the motor.

FIG. 5 shows a conventional inner rotor type brushless motor 13 including: a stator assembly 7 which includes casings 11 and 12, a stator core 5 disposed inside the casings 11 and 12 and including a plurality (six in the example; refer to FIG. 6A) of pole teeth 1 each including, as its constituent segment, a tooth head 2 connected to the distal (inner) end thereof, and a plurality of windings 3 each wound around the pole tooth 1 of the stator core 5 so as to spread in the radial direction; and a rotor assembly 6 which includes a magnet 4, a magnet holding member 10 and a shaft 8, and which is rotatably supported by bearings 9 such that the magnet 4 radially opposes the tooth heads 2 of the pole teeth 1 of the stator core 5 with an air gap t therebetween.

In the single-phase brushless motor described above, the number of the pole teeth 1 of the stator core 5 in the stator assembly 7 is equal to the number of magnetic poles of the magnet 4 of the rotor assembly 6. Description will now be made of the stator core 5 included in the above conventional brushless motor 13 with reference to FIGS. 6A and 6B which respectively shows a configuration of the stator core 5 and an enlarged view of a portion of FIG. 6A indicated by A, and also with reference to FIGS. 7A and 7B which additionally show windings and a rotor assembly.

Referring to FIG. 6A, the stator core 5 includes six of the aforementioned pole teeth 1 (1$a$ to 1$f$), and referring to FIGS. 7A and 7B, six of the aforementioned windings 3 (3$a$ to 3$f$) are wound around the pole teeth 1$a$ to 1$f$, respectively, and the magnet 4 of the rotor assembly 6 is disposed to oppose six of the aforementioned tooth heads 2 (2$a$ to 2$f$) of the pole teeth 1$a$ to 1$f$ of the stator core 5.

The windings 3$a$ to 3$f$ wound around the pole teeth 1$a$ to 1$f$ are arranged in the circumferential direction such that a clockwise winding and a counterclockwise winding alternate with each other. The windings 3$a$ to 3$f$ are single-phase windings. The magnet 4 of the rotor assembly 6 has, at the radially outermost portion, six magnetic poles magnetized in the circumferential direction with N and S poles alternating with each other, is disposed to oppose the tooth heads 2$a$ to 2$f$ of the pole teeth 1$a$ to 1$f$ of the stator core 5 in the stator assembly 7, and is provided with the shaft 8, wherein the rotor assembly 6 is rotatably supported. In connection with FIGS. 7A and 7B, the symbol "x" in each of the windings 3$a$ to 3$f$ indicates that the wire comes toward the viewer, and the symbol "•" indicates that the wire goes away from the viewer.

Further, referring to FIG. 8 showing a cross section of the winding 3 wound around the pole tooth 1 of the stator core 5, a height (overall axial direction dimension) H of the winding 3 is represented by a formula: $H = Y + 2 \times W$, where Y is a height (axial direction dimension) of the tooth pole 1, and W is a winding layer thickness of the winding 3.

According to the above formula, if the height Y of the pole tooth 1 is set to a fixed value, the height H of the winding 3 wound around the pole tooth 1 is determined by the winding layer thickness W of the winding 3, and therefore the winding 3 may possibly restrict reduction of the axial dimension of the brushless motor 13. When the winding 3 is wound with a large number of turns at a limited space, the height (axial direction dimension) H of the winding 3 is increased substantially thus hampering reduction of the axial dimension of the brushless motor 13, which is likewise seen with respect to the earlier described motor disclosed in Japanese Patent No. 3524138.

In the above conventional brushless motors disclosed in Japanese Patent No. 3524138 as well as described with reference to FIGS. 5 to 8, the reduction of the axial dimension (overall height) of the motor is blocked by the very presence of the winding wound around the pole tooth of the stator core, thus making it difficult to downsize the motor.

SUMMARY OF THE INVENTION

The present invention has been made to solve the problem described above, and it is an object of the present invention to provide a brushless motor in which the number of pole teeth of a stator core is twice the number of magnetic poles of a rotor magnet, whereby the overall height of the motor can be reduced.

In order to achieve the object described above, according to an aspect of the present invention, there is provided a brushless motor including: a stator assembly including a stator core which includes a plurality of pole teeth each having a winding wound therearound; and a rotor assembly including a magnet which has a ring shape, is rotatably disposed so as to oppose the pole teeth of the stator core and which is magnetized with a plurality of magnetic poles in the circumferential direction such that opposite polarities alternate with each other, wherein the number of the pole teeth of the stator core is twice as large as the number of the magnetic poles of the magnet such that each of the magnetic poles opposes a pair of pole teeth adjacent to each other, one pair of adjacent windings disposed respectively around one pair of adjacent pole teeth have the same number of winding turns and the same winding direction as each other, and wherein another pair of adjacent windings disposed respectively around another pair of adjacent pole teeth located next to the one pair of adjacent pole teeth have the same number of winding turns as each other and have a winding direction opposite to the winding direction of the one pair of adjacent windings.

In the aspect of the present invention, the pair of adjacent pole teeth may include respective tooth heads different in configuration from each other.

Also, in the aspect of the present invention, an air gap distance between the magnet and the tooth head of one pole tooth of the pair of adjacent pole teeth may be different from an air gap distance between the magnet and the tooth head of the other pole teeth of the pair of adjacent pole teeth.

Accordingly, since the number of the pole teeth is twice as large as the number of the magnetic poles of the magnet in the present invention compared to the conventional brushless motor in which the number of the pole teeth is equal to the number of the magnetic poles of the magnet, the number of turns of the winding wound around each pole tooth can be reduced almost to the half and so the thickness of the winding layer can be halved compared to the conventional motor, which results in reducing the height of the winding thus eventually contributing to reducing the axial dimension of the motor.

Also, since the pair of pole teeth adjacent to each other have respective tooth heads different in configuration from each other and since the air gap distance measured from the magnet at one tooth head of the pair of pole teeth is different from the air gap distance measured from the magnet at the other tooth head, the attraction and repulsion forces differ from one pole tooth to the other thereby causing the rotor assembly to rotate in a good shape.

BRIEF DESCRIPTION OF THE DRAWINGS

FIG. 3 is a cross sectional view of a pole tooth and a winding wound around the pole tooth in the brushless motor according to the present invention, explaining a dimension of the winding;

DETAILED DESCRIPTION OF THE INVENTION

Figure 1A:
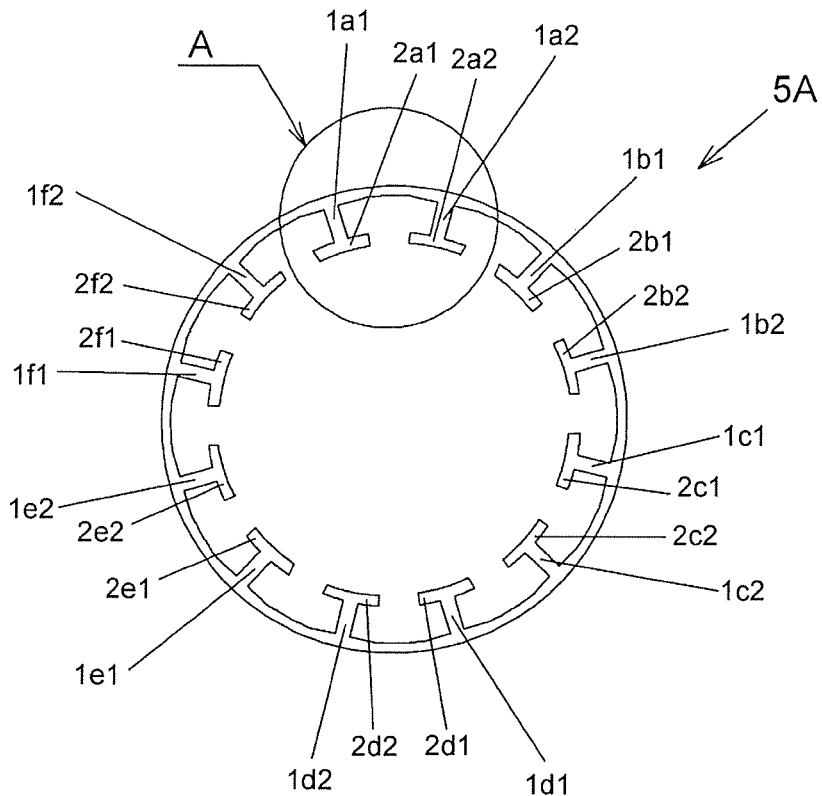
FIG. 1A is a plan view of a stator core employed in a brushless motor (inner rotor type) according to a first embodiment of the present invention.

Exemplary embodiments of the present invention will be described with reference to the accompanying drawings. In explaining the embodiments of the present invention, any component parts corresponding to those in the drawings earlier referred to for describing the related art are denoted by the same reference numerals.

A brushless motor according to a first embodiment of the present invention will hereinafter be described. It is to be noted here that while the first embodiment refers to an inner rotor type brushless motor, the present invention is applicable also to an outer rotor type brushless motor as will be described hereinafter (refer to FIG. 4A).

Referring to FIG. 1A, the brushless motor (inner rotor type) according to the first embodiment includes a stator core 5A which is structured such that a plurality of ring-shaped thin plates (made of silicon steel or the like) are stacked on one another in the axial direction, and such that a plurality (twelve in the figure) of pole teeth or pole tooth portions 1A (refer to FIG. 3), specifically (1a1, 1a2) to (1f1, 1f2), are arranged at the inner circumference of the ring-shaped portion so as to extend radially inwardly wherein a slot is formed between two adjacent pole teeth.

Figure 6A:
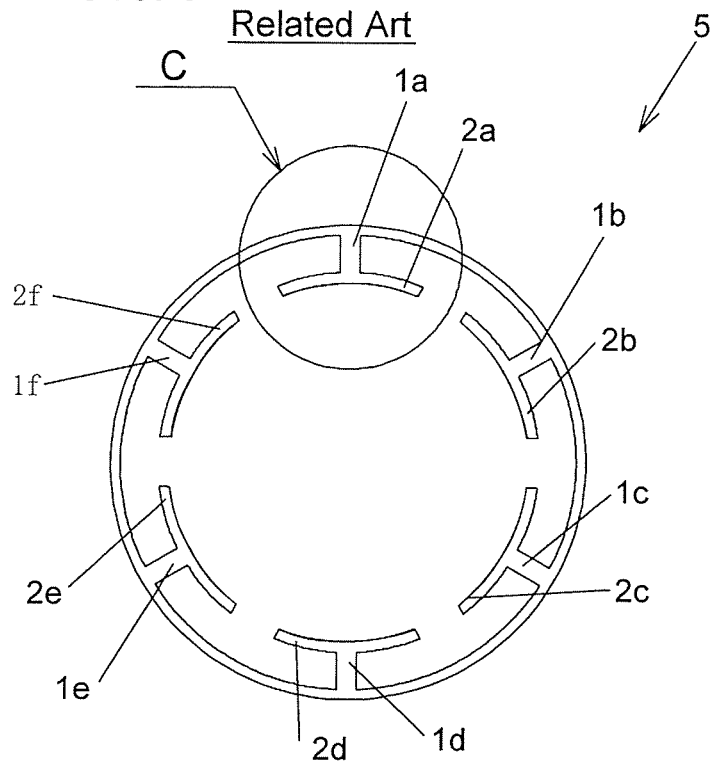
FIG. 6A is a plan view of a stator core in the brushless motor of FIG. 5.
Figure 6B:
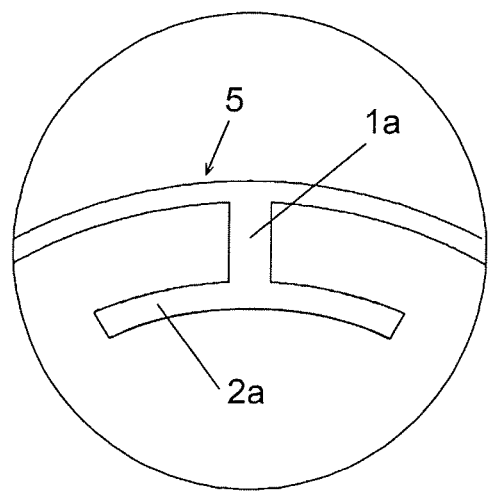
FIG. 6B is an enlarged view of a circled portion C in FIG. 6A.

Here, for the convenience of explanation, it is to be assumed that the pole teeth (1a1, 1a2) to (1f1, 1f2) shown in FIG. 1A are basically constructed such that each one pole tooth (for example, 1a) of the six pole teeth 1a to 1f in the conventional brushless motor (refer to FIG. 6A) is split circumferentially into a pair of pole teeth (for example, 1a1 and 1a2: hereinafter referred to, respectively, as first and second pole teeth of the pair as appropriate). The pole teeth (1a1, 1a2) to (1f1, 1f2) include, as their constituent segment, respective tooth heads (2a1, 2a2) to (2f1, 2f2) as shown in FIG. 1A.

Figure 2A:
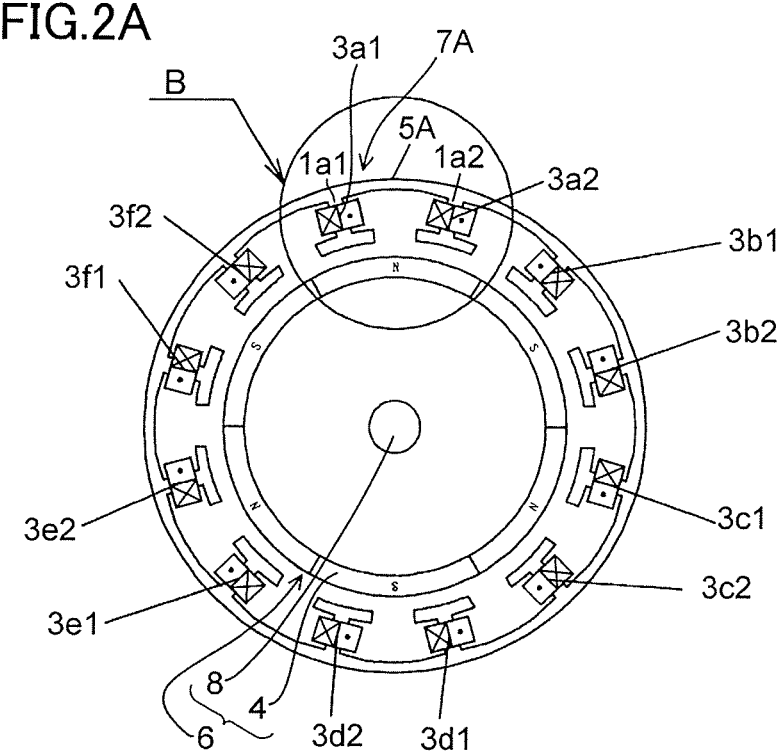
FIG. 2A is a schematic plan view of the stator core shown in FIG. 1A provided with windings, further showing a rotor magnet.

Accordingly, in the present embodiment, each pair of pole teeth are situated to face one magnetic pole (N or S) of a magnet 4 of a rotor assembly 6 as shown in FIG. 2A. Thus, the brushless motor of the present embodiment has a structure of "twelve stator pole teeth versus six rotor magnetic poles", while the conventional brushless motor usually has a structure of "six stator pole teeth versus six rotor magnetic poles".

That is to say, the first pole teeth 1a1, 1b1, 1c1, 1d1, 1e1 and 1f1 and the second pole teeth 1a2, 1b2, 1c2, 1d2, 1e2 and 1f2 are disposed at the inner circumference of the ring-shaped portion of the stator core 5A such that the first pole tooth and the second pole tooth are arranged alternately with each other and located substantially equidistantly so as to sandwich a slot therebetween.

Figure 1B:
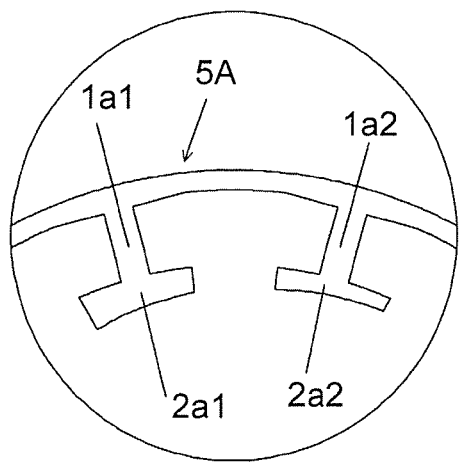
FIG. 1B is an enlarged view of a circled portion A in FIG. 1A.

Referring to FIG. 1B, the tooth head 2a1 of the first pole tooth 1a1 is configured to have a different dimension from the tooth head 2a2 of the second pole tooth 1a2, specifically such that the tooth head 2a1 has a larger width (radial direction dimension) than the tooth head 2a2.

Also, both the tooth head 2a1 of the first pole tooth 1a1 and the tooth head 2a2 of the second pole tooth 1a2 are shaped to extend in both circumferential directions from the distal ends of the pole teeth 1a1 and 1a2, respectively, wherein the widths (radial direction dimensions) of the tooth heads 2a1 and 2a2 decrease gradually in the clockwise direction in the figure thus forming an asymmetric shape in the circumferential direction. More specifically, the tooth head tapers off gradually in the clockwise direction so that an air gap t between the magnet 4 of the rotor assembly 6 and each of the tooth heads increases in the clockwise direction (refer to FIG. 2B).

Figure 7A:
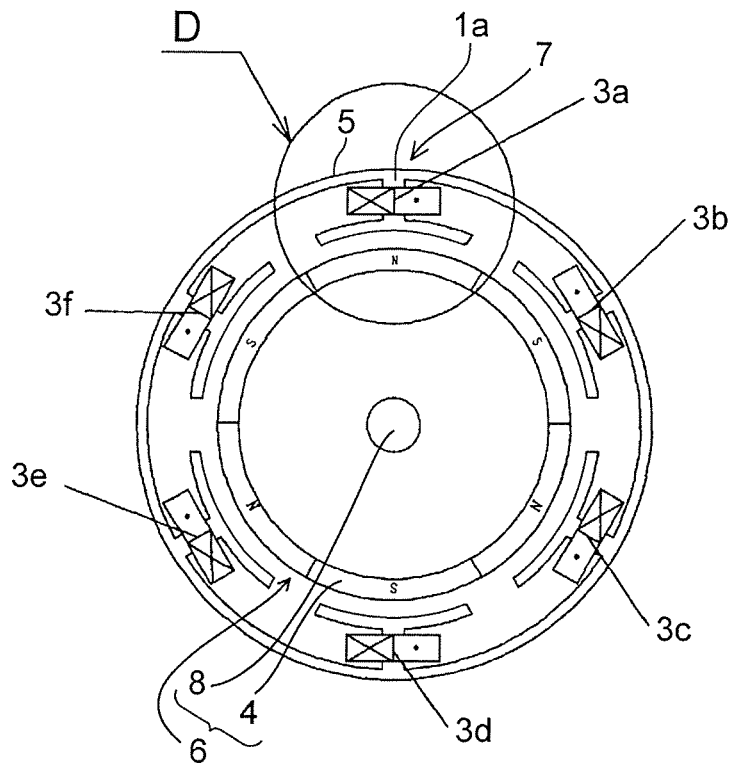
FIG. 7A is a schematic plan view of the stator core of FIG. 6A provided with windings, further showing a rotor magnet.
Figure 7B:
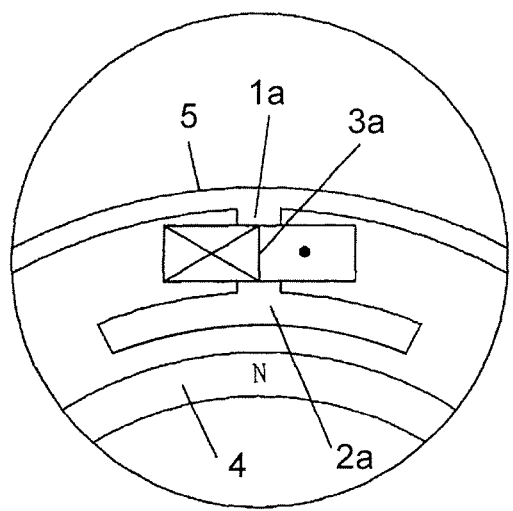
FIG. 7B is an enlarge view of a circled portion D in FIG. 7A.

FIG. 2A schematically shows a positional arrangement of a stator assembly 7A according to the present embodiment and the magnet 4 of the rotor assembly 6. Referring to FIG. 2A, for example, windings 3a1 and 3a2, which are wound respectively around the first and second pole teeth 1a1 and 1a2 of one pair of pole teeth, have the same number of turns and the same winding direction as each other, and each of the windings 3a1 and 3a2 has a turn number approximately equal to the half of the turn number of the winding 3a of the stator assembly 7 employed in the conventional motor (refer to FIG. 7A). Windings 3b1 and 3b2, which are wound respectively around the first and second pole teeth 1b1 and 1b2 of another pair of pole teeth located next to the aforementioned one pair of pole teeth 1a1 and 1a2, are arranged in the same way as the windings 3a1 and 3a2 wound around the one pair of pole teeth 1a1 and 1a2 except that their winding direction is opposite to the winding direction of the windings 3a1 and 3a2. The windings (3a1, 3a2) to (3f1, 3f2) are singe-phase windings and configure a same phase. The radially outermost portion of the magnet 4 of the rotor assembly 6 is magnetized with N and S poles alternating with each other in the circumferential direction, and is disposed to radially oppose the stator assembly 7A, specifically the tooth heads (2a1, 2a2) to (2f1, 2f2) of the pole teeth (1a1, 1a2) to (1f1, 1f2) of the stator core 5A, wherein the magnet 4 is provided with the shaft 8 and rotatably supported.

Figure 2B:
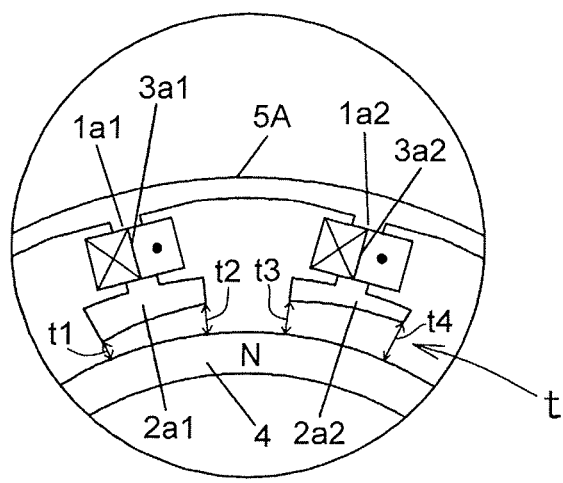
FIG. 2B is an enlarged view of a circled portion B in FIG. 2A.

FIG. 2B shows in close-up a circled portion A shown in FIG. 2A illustrating the windings 3a1 and 3a2 wound respectively around the first and second pole teeth 1a1 and 1a2 of the one pair of pole teeth, wherein the winding 3a1 has the same winding direction and substantially the same turn number as the winding 3a2. In order to generate an asymmetric magnetomotive force to thereby get the motor to start running smoothly, the tooth head 2a1 of the first pole tooth 1a1 is configured to have a different geometry from the tooth head 2a2 of the second pole tooth 1a2, wherein the tooth heads 2a1 and 2a2 each have an asymmetric shape in the circumferential direction. Also, the air gap t between the tooth head 2a1 and the magnet 4 is the smallest at the tooth head left end (t1) and increases gradually toward the tooth head right end (t2), and the air gap t between the tooth head 2a2 and the magnet 4 is the smallest at the tooth head left end (t3) and increases gradually toward the right end (t4), wherein the air gap t between the tooth heads 2a1 and 2a2 of the one pair of pole teeth 1a1 and 1a2 and the magnet 4 increases gradually in the order of "at the left end of the tooth head 2a1 (t1)", "at the right end of the tooth head 2a1 (t2)", then "at the left end of the tooth head 2a2 (t3)" and "at the right end of the tooth head 2a2 (t4)". This applies to the air gap t at the other pairs of pole teeth in the same manner.

In the brushless motor structured as described above, when the windings of the stator assembly are energized by means of a motor control circuit (not shown), each of the pole teeth of the stator core is magnetized with a polarity opposite to the polarity (N or S) of a magnetic pole of the rotor magnet, which opposes the relevant pole tooth. Since the magnetic poles of the rotor magnet oppose the corresponding pole teeth of the stator core with respective different air gap distances therebetween, the attraction and repulsion forces generated between the pole teeth and the rotor magnet are caused to differ from pole tooth to pole tooth, which prevents that the stator assembly and the rotor assembly define what is called a "dead center" thus causing a failure to get the rotor assembly to start rotating.

When the rotor assembly is caused to rotate, the rotational position of the rotor magnet, that is the boundary between the adjacent magnetic poles, is detected by a sensor (not shown), and the direction of energization of the windings is reversed by the detection signal, whereby the pole teeth are provided with electromagnetic poles having polarities opposite to the polarities of the magnetic poles of the rotor magnet, which oppose the relevant pole teeth, thus sequentially providing the rotor assembly with turning force.

Figure 4A:
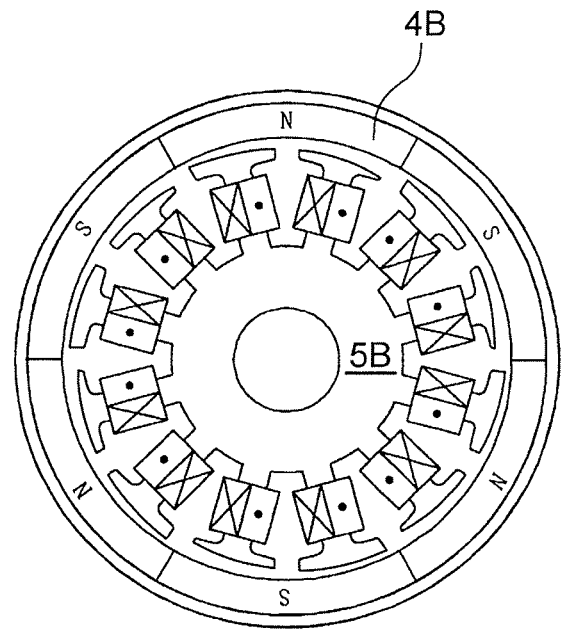
FIG. 4A is a schematic plan view of a stator core with windings and a rotor magnet in a brushless motor (outer rotor type) according to a second embodiment of the present invention.
Figure 4B:
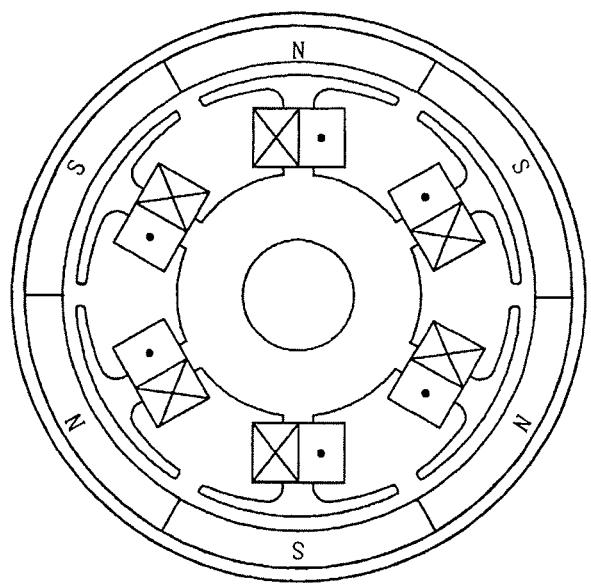
FIG. 4B is a schematic plan view of a stator core with windings and a rotor magnet in a conventional brushless motor of same type as FIG. 4A (outer rotor type) as a comparison example.
Figure 5:
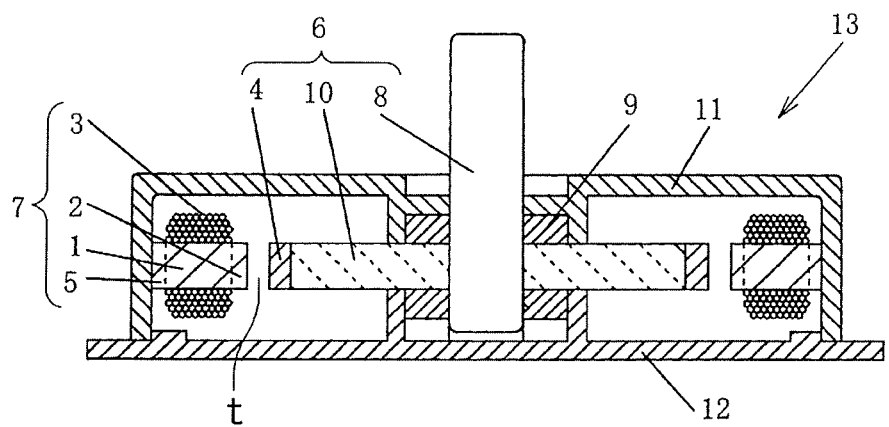
FIG. 5 is an axial cross sectional view of a conventional inner rotor type brushless motor.

Description will now be made of a second embodiment of the present invention with reference to FIG. 4A and also FIG. 4B. The present invention can be applied to an outer rotor type brushless motor as described earlier. FIG. 4A shows an outer rotor type brushless motor according to the second embodiment, which includes a stator core 5B and a magnet 4B of a rotor assembly. In the brushless motor shown in FIG. 4A according to the present embodiment, the stator core 5B includes twelve pole teeth and the magnet 4B is provided with six magnetic poles, while in a conventional outer rotor type brushless motor shown in FIG. 4B as an comparison example, a stator core includes six pole teeth and a rotor magnet is provided with six magnetic poles.

Figure 8:
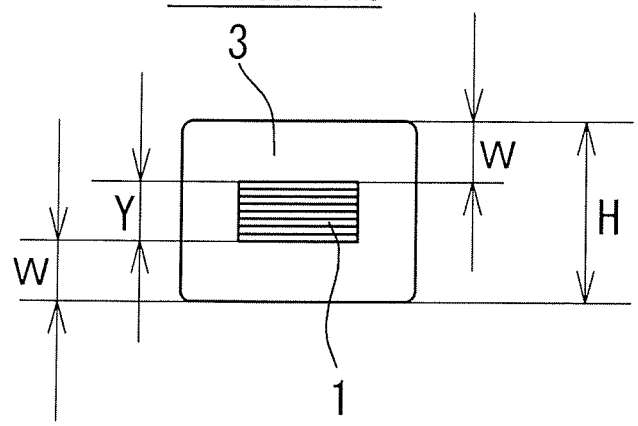
FIG. 8 is a cross sectional view of a pole tooth and a winding wound around the pole tooth in the conventional brushless motor, explaining a dimension of the winding.

In the present invention, it is arranged that the number of pole teeth of a stator core is twice as large as the number of magnetic poles of a rotor magnet on the assumption that one pole tooth of a conventional motor is partitioned into two pole teeth (a pair of pole teeth) wherein since the number of winding turns around each pole tooth of the pair of pole teeth is reduced to half, the thickness of a winding layer is almost halved (½×W) as shown in FIG. 3 compared to the winding layer thickness W (refer to FIG. 8) in the conventional motor. Accordingly, if the stator core 5A has the same thickness as the stator core 5 (that is to say, the pole teeth 1A also have a height Y), a height (axial direction dimension) H' of the winding 3A is represented by a formula: H'=Y+W, thus the winding height H' of the winding 3A (present invention) is smaller than the height H (H=Y+2×W) of the winding 3 (conventional motor) by the dimension W.

Also, the overall length of the wire required for forming the windings 3A is reduced compared to the windings 3, and therefore the resistance value is lowered resulting in reduction of copper loss. According to the above described arrangement of the pole teeth according to the present invention, the number of winding turns around each pole tooth is reduced to half thereby reducing the outer axial direction dimension of the winding (winding height) and eventually reducing the size of the motor.

What is claimed is:

1. A brushless motor comprising:

a stator comprising a stator core having a plurality of pole tooth portions radially extending from a circular portion and coils wound around the plurality of tooth portions, respectively, wherein the coils are each composed as a single phase coil, and each of the plurality of pole tooth portions has a circumferentially extended tooth head portion at a tip portion thereof; and a rotor comprising a magnet having N poles and S poles disposed alternatively in a circumferential direction, wherein a number of the pole tooth portions is twice as large as a number of the magnetic poles of the magnet wherein each of the magnetic poles of the magnet opposes a pair of pole tooth portions of the stator core adjacent to each other, wherein the coils wound on the pair of the pole tooth portions and configuring a same phase are arranged in the same winding direction, and wherein adjacent pairs of the pole tooth portions, respectively opposing adjacent poles of the magnet, are disposed such that the coils of one of the adjacent pairs of the pole tooth portions are arranged in the opposite direction from that of the coils of the other adjacent pair of pole tooth portions.

2. A brushless motor according to claim 1, wherein the pair of tooth portions comprise respective tooth head portions different in configuration from each other.

3. A brushless motor according to claim 2, wherein a gap distance between the magnet and a tooth head portion of one pole tooth of the pair of tooth portions is different from a gap distance between the magnet and a tooth head portion of an other pole tooth portion of the pair of tooth portions.

4. A brushless motor according to claim 2, wherein each of the tooth head portions of the pair of tooth portions has a shape which varies in width from one end to other end thereof.

5. A brushless motor according to claim 2, wherein the pair of tooth head portions each have an asymmetric shape in the circumferential direction, and for each of the pair of tooth head portions an air gap between the tooth head portion and a corresponding one of the magnetic poles of the magnet is smallest at either the right end or the left end of the tooth head portion and greatest at the opposite end of the tooth head portion, with the air gap increasing in size in the same direction for both of the tooth head portions.

6. A brushless motor according to claim 5, wherein the pair of tooth head portions each have a tapered shape which increases in the circumferential direction from one end to the other of the tooth head portion, and the pair of tooth head portions have different widths from each other in the radial direction of the motor.

* * * * *